United States Patent
Narwark

(10) Patent No.: US 7,915,839 B2
(45) Date of Patent: Mar. 29, 2011

(54) METHOD AND ELECTRONIC CONTROL SYSTEM TO COMPENSATE FOR THE AGING-RELATED BRIGHTNESS LOSS OF AN ELECTROLUMINESCENT ELEMENT

(75) Inventor: Oliver Narwark, Munich (DE)

(73) Assignee: Schreiner Group GmbH & Co. KG, Oberschleissheim (DE)

( * ) Notice: Subject to any disclaimer, the term of this patent is extended or adjusted under 35 U.S.C. 154(b) by 913 days.

(21) Appl. No.: 11/793,166

(22) PCT Filed: Dec. 1, 2005

(86) PCT No.: PCT/EP2005/056379
§ 371 (c)(1), (2), (4) Date: Jul. 27, 2007

(87) PCT Pub. No.: WO2006/063938
PCT Pub. Date: Jun. 22, 2006

(65) Prior Publication Data
US 2008/0224070 A1    Sep. 18, 2008

(30) Foreign Application Priority Data
Dec. 14, 2004 (DE) .......................... 10 2004 060 201

(51) Int. Cl.
H05B 37/02 (2006.01)
(52) U.S. Cl. ................... 315/360; 315/169.3; 315/291; 315/307; 345/77; 345/76; 345/212
(58) Field of Classification Search ................. 315/149, 315/156, 158, 169.1, 169.3, 224, 246, 291, 315/307, 360; 345/76–78, 81, 87, 101, 102, 345/211, 212
See application file for complete search history.

(56) References Cited

U.S. PATENT DOCUMENTS

| 3,185,893 | A | * | 5/1965 | Sperling | 315/246 |
| 5,027,036 | A | | 6/1991 | Ikarashi et al. | |
| 5,493,183 | A | | 2/1996 | Kimball et al. | |
| 6,414,661 | B1 | | 7/2002 | Shen et al. | |
| 6,977,471 | B2 | * | 12/2005 | Feldman et al. | 315/169.3 |
| 7,081,720 | B2 | * | 7/2006 | Burau et al. | 315/291 |
| 7,230,387 | B2 | * | 6/2007 | Feldman et al. | 315/169.3 |
| 7,321,348 | B2 | * | 1/2008 | Cok et al. | 345/82 |

FOREIGN PATENT DOCUMENTS
WO    WO 03/107313 A2    12/2003

* cited by examiner

Primary Examiner — Haissa Philogene
(74) Attorney, Agent, or Firm — Collard & Roe, P.C.

(57) ABSTRACT

The invention relates to a method for compensating the ageing-related loss of luminosity of an electroluminescence element, according to which the cumulative electrical energy supply, i.e. the integral of the supplied electrical power over the period of operation, is used as a criteria for the compensating regulation of the operating voltage. The processing unit continuously integrates the supplied electrical power over time. The relation between the operating voltage and the emission luminosity of the electroluminescence element is stored in the memory for different cumulative electrical energy supplies. The stored data can be defined by means of a model or estimated on the basis of empirical values. The relation can be stored in the form of values stored in a tabular manner or as an analytical function in the memory. The processing unit determines the associated effective operating voltage Ui for the luminosity nominal value B and the cumulative energy supply /Pi dt, and adjusts the voltage supply to the value by means of a control signal emitted from the signal output.

8 Claims, 3 Drawing Sheets

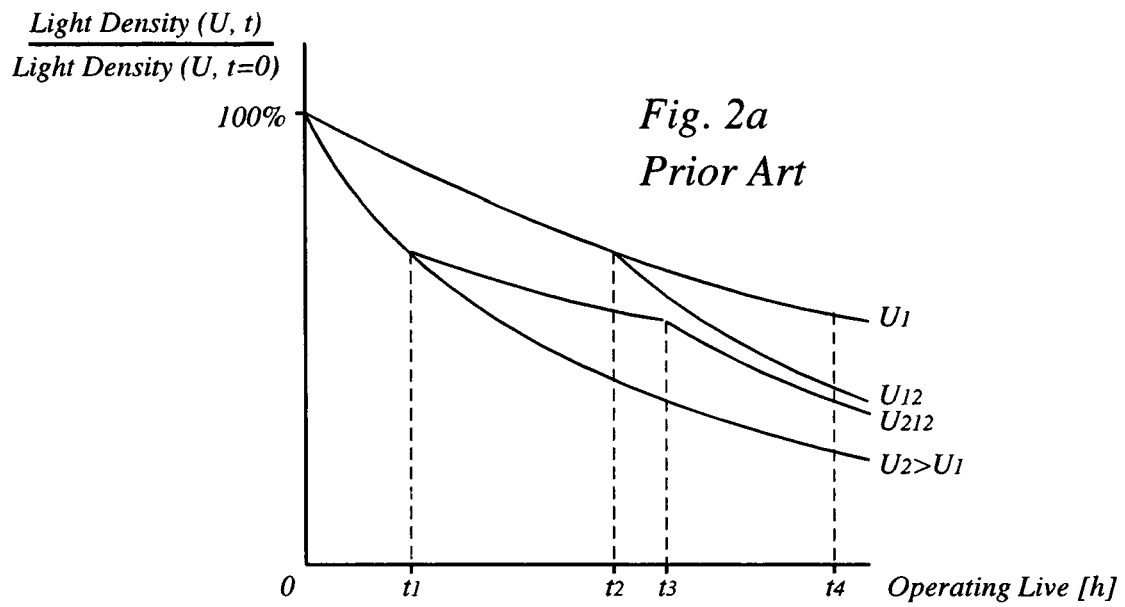
Fig. 2a
Prior Art
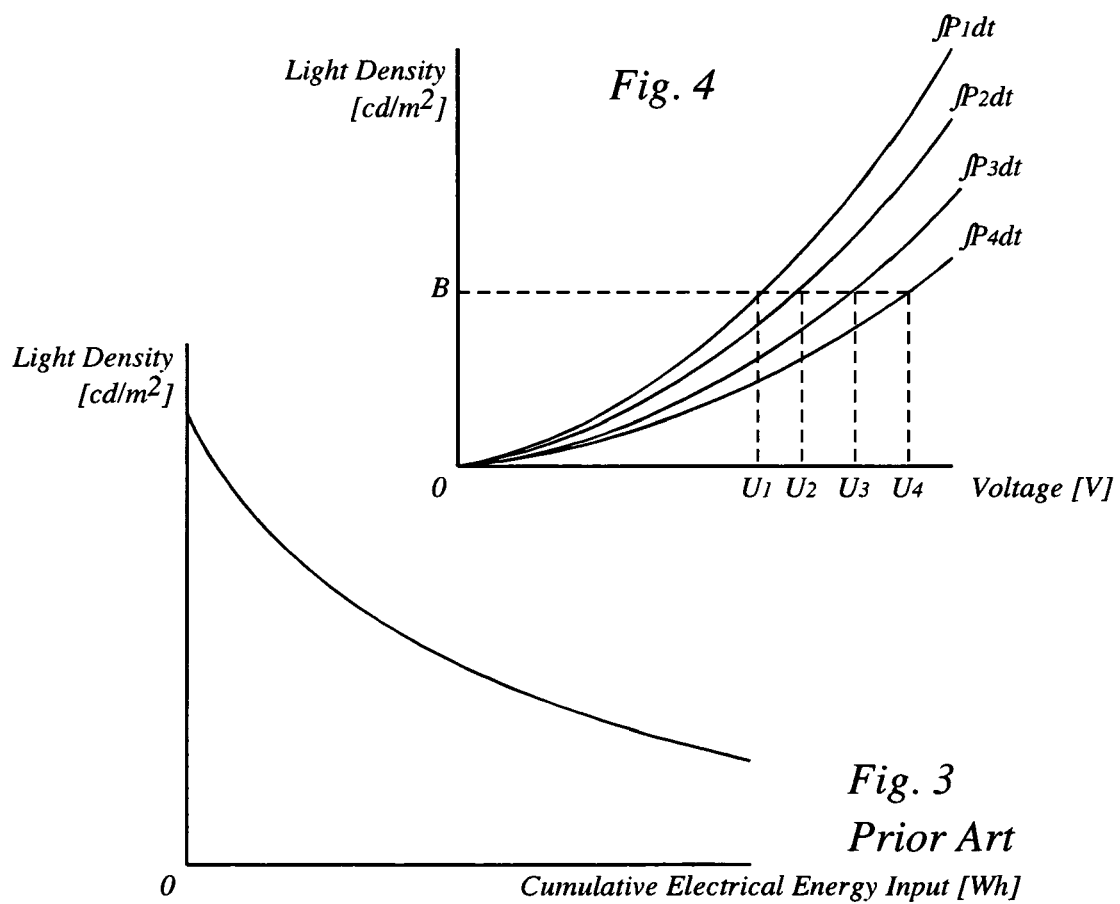
Fig. 4
Fig. 3
Prior Art

METHOD AND ELECTRONIC CONTROL SYSTEM TO COMPENSATE FOR THE AGING-RELATED BRIGHTNESS LOSS OF AN ELECTROLUMINESCENT ELEMENT

CROSS REFERENCE TO RELATED APPLICATIONS

Applicant claims priority under 35 U.S.C. §119 of German Application No. 10 2004 060 201.8 filed Dec. 14, 2004. Applicant also claims priority under 35 U.S.C. §365 of PCT/EP2005/056379 filed Dec. 1, 2005. The international application under PCT article 21(2) was not published in English.

BACKGROUND OF THE INVENTION

1. Field of the Invention

The present invention relates to a method and an electronic control system to compensate for the expecting aging-related brightness loss of an electroluminescent element operated using AC voltage.

Electroluminescence technology has increasingly gained in significance in recent time. It allows the implementation of almost arbitrarily large homogeneous illuminated areas which are free of screens and shadows. At the same time, power consumption and overall depth are extremely low (in the magnitude of one millimeter and less). The typical applications include, in addition to the background illumination of liquid crystal displays, the backlighting of transparent films which are provided with inscriptions and/or graphics.

Electroluminescence (in short: EL) is understood as the direct luminescence excitation of luminescent pigments and/or luminophores by an electric alternating field. Electroluminescence elements (in short: EL elements) based on thick-film technology using inorganic luminescent pigments and/or luminophores and AC voltage excitation have become widespread. In relation to thin-film EL elements, thick-layer EL elements are less complex and thus more cost-effective to produce.

The luminescent pigments and/or luminophores are embedded in an organic or inorganic binder, which is as transparent as possible (or at least not completely opaque). Starting materials are usually zinc sulfides, which generate different, relatively narrow band emission spectra as a function of the doping and/or co-doping and preparation procedure. The focus of the spectrum determines the particular color of the emitted light.

The exciting AC voltage field typically has a frequency of a few hundred hertz, the effective value of the operating voltage frequently being in a range from approximately 50 to 150 volts. By elevating the voltage, a higher light density may typically be achieved, which is usually in a range from approximately 10 to approximately 200 candelas per square meter. A frequency increase usually causes a color shift toward lower wavelengths. However, both parameters must be tailored to one another to achieve a desired light impression.

2. The Prior Art

The service life of an EL element is limited. It is a function above all of the level and frequency of the AC voltage applied, in addition, however, also of environmental influences, particularly the effects of moisture and UV radiation. The service life of an EL element is typically specified as a half-life of the luminescent pigments. This is the time after which the light density has fallen to half of the starting value under the influences of the electrical field with unchanged operating conditions. In practice, the light density decreases to half of the original value within approximately 2000 to 3000 operating hours.

The reduction of the brightness because of the appearance of aging does not occur suddenly, but rather essentially continuously with increasing operating life.

A method and an electronic control system to compensate for the aging-related brightness loss of an electroluminescent element operated using AC voltage are known from U.S. Pat. No. 5,493,183. The operating life is cumulatively detected and the operating voltage is raised with increasing operating life to compensate for the aging-related brightness loss. The controller makes use of a table of stored comparative data, which shows the expected brightness reduction as a function of the operating life.

When the method known from U.S. Pat. No. 5,493,183 is applied, it is to be observed, inter alia, that the compensation of the aging-related brightness loss only succeeds inadequately depending on the mode of operation of a correspondingly controlled electroluminescent element. This problem occurs in particular if the voltage is also varied in another way in addition to counteracting the aging-related brightness loss, for example, to adapt the brightness of the EL element to the ambient brightness via voltage regulation.

An optical sensor which measures the brightness of the EL element could be used as a measure for more exact correction of the voltage to compensate for the aging-related brightness loss, but, on one hand, this would be connected with significant technical outlay and corresponding costs. On the other hand, a sensor of this type could be influenced by light from the surroundings and register a lower aging-related brightness loss than is actually present as a result.

In view of the above-mentioned problems in counteracting aging-related brightness loss according to the prior art, the present invention is based on the object of providing a method and an electronic control system to compensate for the expected aging-related brightness loss of an electroluminescent element operated using AC voltage, which functions reliably even if the electroluminescent element is operated at changing voltage and frequency levels. Furthermore, as much as possible, the method or the electronic control system is to be connected to no or only low additional costs.

SUMMARY OF THE INVENTION

The object is achieved according to one aspect of the present invention by a method to at least partially compensate for at least one of (1) the expected aging-related brightness loss and (2) the aging-related shift of the color location of an electroluminescent element operated using AC voltage, wherein at least one of the brightness and the color location of the electroluminescent element is corrected by changing at least one of the voltage amplitude and frequency of the AC voltage dependent on the cumulative electrical energy input detected over the service life of the electroluminescent element up to this point. The object is achieved according to a further aspect of the present invention by an electronic control system to at least partially compensate for at least one of (1) the expected aging-related brightness loss and (2) the aging-related shift of the color location of an electroluminescent element operated using AC voltage, wherein the electronic control system has a voltage supply for applying a variable AC voltage to the electroluminescent element, means for detecting the electrical energy input, and a control unit, which has a signal output for outputting a control signal to the voltage supply dependent on the cumulative electrical energy input detected over the service life of the electroluminescent element up to this point, via which at least one of the voltage amplitude and the frequency of the AC voltage is controllable. Expected aging-related brightness loss is understood as the brightness reduction which is expected because of data obtained empirically on the basis of a design or by estimation.

According to the present invention, the operating voltage and/or operating frequency is not regulated solely as a function of the operating life alone, but rather as a function of the electrical energy input up to this point. For this purpose, the electrical power and/or a variable related thereto is detected continuously. The integral calculated over the electrical power from the first beginning of operation up to the current instant corresponds to the cumulative electrical energy input.

An aging-related brightness loss is typically compensated for by a voltage increase (i.e., an increase of the voltage amplitude). A change of the frequency of the AC voltage allows a correction of the color location, a frequency increase typically causing a shift of both the x and also the y coordinates of the color location in the CIE system toward lower values. A frequency adaptation is advantageous in two regards. On one hand, an increase of the operating voltage may cause an opposing shift of the color location, which may be compensated for by a frequency increase. On the other hand, the light color of an EL element may change with increasing age depending on the electroluminophores used, as well as depending on the effect of environmental influences and/or the protection of the electroluminophores therefrom (by microencapsulation, for example), so that this may also be counteracted by a corresponding frequency adaptation.

The adjustment of the operating voltage as a function of cumulative electrical energy input according to the present invention offers smaller deviations from the setpoint brightness of a correspondingly regulated EL element than in the prior art. Namely, it has been found that a specific aging-related brightness loss occurs later if an EL element is frequently operated at reduced operating voltage (as is the case in dimmable instrument lights in automobiles, for example), than in the event of continuous operation at the rated operating voltage. A typical controller, which increases the operating voltage solely as a function of the total operating life, therefore tends to set too high a voltage in a case of this type, i.e., to overcompensate for the actual aging-related brightness loss, which in turn results in somewhat more rapid aging of the EL element. Because, in contrast, the voltage is not increased more than necessary with increasing operating life according to the present invention, the total service life of an EL element controlled according to the present invention also lengthens.

The adjustment parameters of voltage amplitude and/or frequency to be selected as a function of the cumulative electrical energy input may be stored in the form of discrete comparative values and/or on the basis of a function in mathematical analytical form. A function of this type and/or a suitable number of comparative values may be empirically obtained on the basis of a design of the EL element to be controlled and/or also by accessing experiential or estimated values. Linear or polynomial regression suggests itself for formulating a function on the basis of corresponding divided values, the latter allowing higher precision of the reproduction of the established relationship between the cumulative energy input and the voltage regulation required to achieve uniform light densities.

According to an advantageous implementation of the present invention, the voltage amplitude and/or frequency is adjusted in steps. Preferably, a new step is first set upon the next turning-on procedure of the EL element, after, according to the stored relationship, a change of the adjustment parameter is predefined on the basis of reaching a corresponding cumulative electrical energy input. This prevents the correction from being recognizable as a sudden, abrupt change of the brightness to the observer.

In principle, any variant of the present invention described or indicated in the framework of the present application may be especially advantageous, depending on the economic and technical conditions in the specific case. If not noted to the contrary and if able to be technically implemented in principle, individual features of the embodiments described are exchangeable or combinable with one another.

BRIEF DESCRIPTION OF THE DRAWINGS

In the following, an example of a preferred embodiment of the present invention is described in greater detail on the basis of the associated figures, which are to be viewed as purely schematic.

FIG. 2a shows the aging-related brightness reduction of a typical EL element as a function of the operating life at different, partially changing operating voltages, the light density being plotted scaled, FIG. 3 shows the aging-related brightness reduction of a typical EL element as a function of the cumulative electrical energy input, FIG. 4 shows a family of curves which reproduces the dependence of the brightness on the operating voltage for different cumulative electrical energy inputs.

DETAILED DESCRIPTION OF THE PREFERRED EMBODIMENTS

Figure 1:
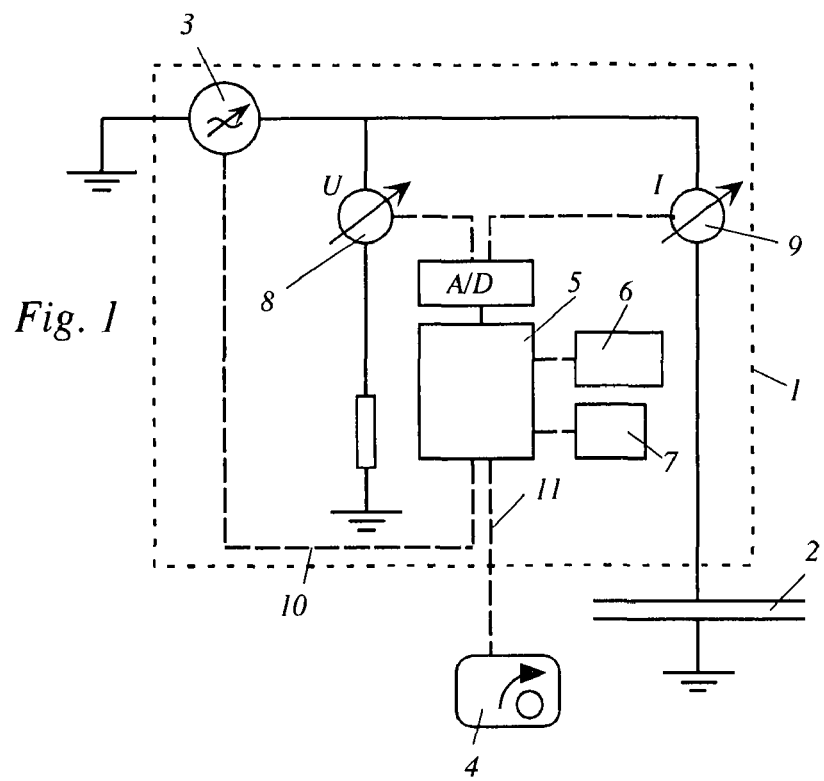
FIG. 1 shows a simplified block diagram of an EL element having an electronic control system according to the present invention.

FIG. 1 shows a simplified block diagram of an EL element 2 having an electronic control system 1 according to the present invention to compensate for the expected aging-related brightness loss of the EL element 2.

Figure 2B:
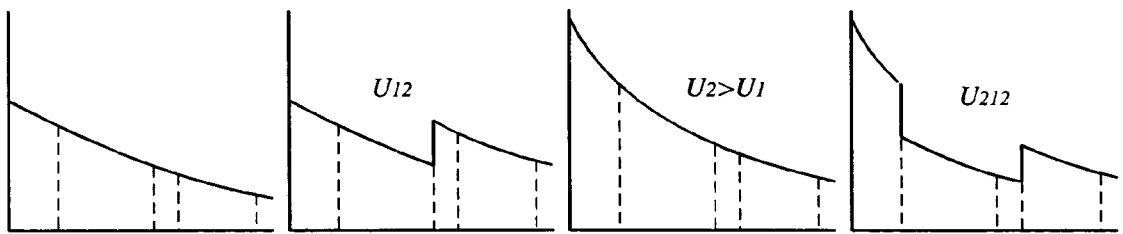
FIG. 2b shows the aging-related brightness reduction of a typical EL element as a function of the operating life at different, partially changing operating voltages, the light density being plotted absolutely (not scaled), and the individual curves of the family being shown once again in smaller partial images.
Figure 2B:
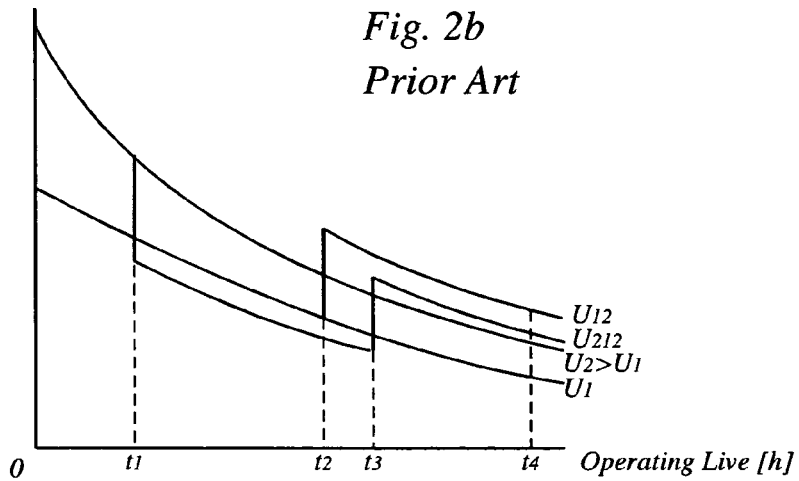

The problems of brightness reduction with increasing aging of the EL element 2 may be reconstructed on the basis of FIG. 2a. The uppermost curve shows the reduction of the light density over the operating life at a constant effective operating voltage U1. The light density is—as also in the other curves of the diagram—scaled to the light density which the EL element would have at identical voltage after an operating life of 0. The lowermost curve shows the reduction of the brightness over the operating life at a constant effective operating voltage U2>U1. The two middle curves show the reduction of the brightness with changing operating voltage; a change of the operating voltage is recognizable as a bend in the shape of the curve. The curve U12 shows the curve for the operation at the voltage U1 up to the operating life t2 and subsequent operation at the voltage U2. Correspondingly, the left curve branch of the curve U12 runs concurrently with the curve for continuous operation at the voltage U1. The curve U212 shows the curve for the operation at the voltage U2 up to an operating life t1, subsequent operation at the voltage U1 up to an operating life t3, and then renewed operation at the voltage U2. As the curves show, the aging-related brightness loss after identical operating life t4 may be very different depending on the mode of operation.

With non-scaled illustration, i.e., if the absolute values of the light density are used as the ordinate, voltage changes are visible as a jump. This is clear on the basis of FIG. 2b, in which the same curves are plotted as in FIG. 2a, but not scaled. The smaller partial images once again show the prior course of the individual curves of the family. It may be seen that at the same time t4 at the same voltage U=U2, three different light densities are measured depending on the previous history of the EL element [(U2; t=t4); (U12; t=t4); (U212; t=t4)].

For the compensation according to the present invention of the aging-related brightness loss, the cumulative electrical energy input, i.e., the integral of the supplied electrical power over the operating life, is used as the criterion for the correction of the operating voltage to be compensated for. If the brightness is plotted over the cumulative electrical energy input instead of over the operating life, a scaled graph is obtained which is largely independent of the mode of operation. The qualitative curve shape is shown in FIG. 3.

The processing unit 5 continuously integrates the input electrical power over time. For this purpose, the measured signal from voltage measuring means 8 and current measuring means 9 is input via an analog/digital converter (A/D) and the electrical power is calculated from the voltage and current strength. A timing element 7 provides the processing unit 5 with the time signal required for the integration.

A desired brightness B is input via an input Channel 11 into the processing unit 5 as the supply value using the external manual selecting knob 4. Alternatively or additionally, the input of the ambient brightness measured via a sensor is conceivable; as a function thereof, a setpoint brightness of the EL element 2 may be predefined using a relationship stored in the memory 6.

In the memory 6, the relationship between operating voltage and emission brightness of the EL element 2 is also stored for various cumulative electrical energy inputs. This relationship is illustrated in FIG. 4 as the family of curves $\int P1\, dt$, $\int P2\, dt$, $\int P3\, dt$, $\int P4\, dt$. After the EL element 2 is loaded with the higher cumulative energy input $\int P4\, dt$, a higher operating voltage U4 is needed to reach the same emission brightness B than after loading using the lower cumulative energy input $\int P1\, dt$, where the lower operating voltage U1 suffices for this purpose. The stored data may be determined empirically with the aid of a design or may be based on estimation from experiential values. The relationship may be saved in the memory in the form of values stored in a table or as an analytically expressed function (typically obtained by polynomial regression).

The processing unit 5 ascertains the associated effective operating voltage Ui for the brightness set point value B and the cumulative energy input $\int Pi$, as indicated in the graph in FIG. 4, and sets the voltage supply 3 to this value using a control signal output via the signal output 10.

Figure 5A:
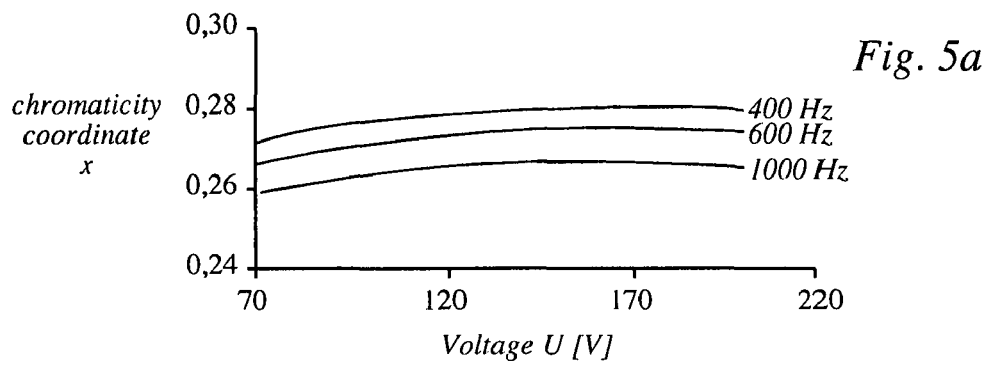
FIG. 5a shows the x coordinate of the color location (in the CIE system) of the radiation emitted by an EL element as a function of operating voltage and operating frequency.
Figure 5B:
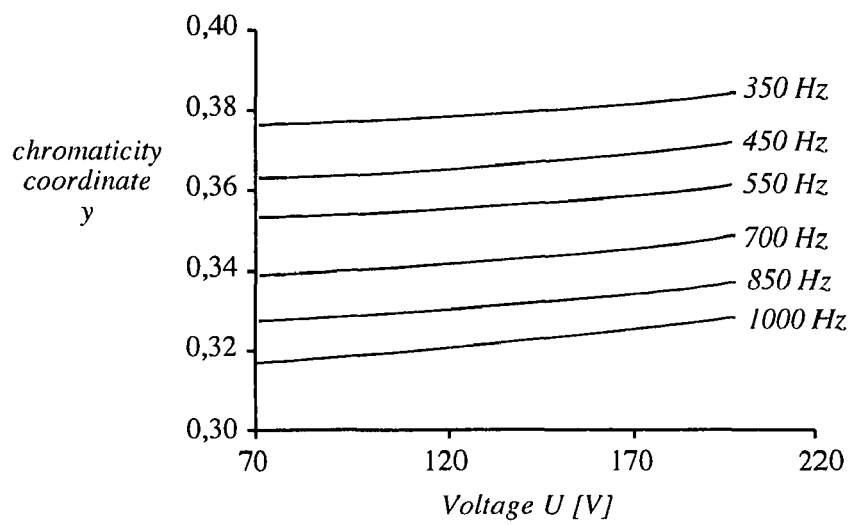
FIG. 5b shows the y coordinate of the color location (in the CIE system) of the radiation emitted by an EL element as a function of operating voltage and operating frequency.

Furthermore, the voltage supply 3 may optionally also have an adapted AC voltage frequency predefined via the signal output 10 to achieve any correction of the color location of the radiation emitted by the EL element 2. The relationship between color location, operating voltage, and operating frequency which such a correction is based on is reproduced in FIGS. 5a-b. The illustration in FIG. 4 already indicates the possibility of adapting the effective operating voltage in steps to the cumulative energy input. This means that the processing unit 5 operates using the relationship between operating voltage and emission brightness valid for a cumulative energy input $\int Pi\, dt$ until the next cumulative energy input $\int Pi+1\, dt$ is reached, for which the relationship between operating voltage and emission brightness is stored in the memory 6.

Preferably, the relationship stored for each new step $\int P1\, dt$, $\int P2\, dt$, $\int P3\, dt$, $\int P4\, dt$ is first used when the EL element is next turned on procedure. This prevents the correction being recognizable to the observer as a sudden, abrupt change of the brightness.

Alternatively, a nearly continuous correction in very small steps is also possible.

The invention claimed is:

1. A method to at least partially compensate for at least one of
    the expected aging-related brightness loss and
    the aging-related shift of the color location of an electroluminescent element operated using AC voltage,
    the method comprising the steps of:
    detecting a cumulative electrical energy input over a current service life of the electroluminescent element from a starting point in time up to a current point in time; and
    correcting at least one of the brightness and the color location of the electroluminescent element by changing at least one of the voltage amplitude and the frequency of the AC voltage dependent on the cumulative electrical energy input detected.

2. The method according to claim 1, wherein the dependence on the cumulative electrical energy input is taken into consideration on the basis of at least one of
    stored discrete comparative values and
    a stored function.

3. The method according to claim 1, wherein the adaptation of at least one of the voltage amplitude and the frequency occurs in steps.

4. The method according to claim 3, wherein the setting of at least one of the voltage amplitude and the frequency to a new step first occurs in each case when the electroluminescent element is turned on the next following time.

5. An electronic control system to at least partially compensate for at least one of
    the expected aging-related brightness loss and
    the aging-related shift of the color location of an electroluminescent element operated using AC voltage,
    said electronic control system comprising:
    a voltage supply for applying a variable AC voltage to the electroluminescent element, means for detecting a cumulative electrical energy input, and
    a control unit, which has a signal output for outputting a control signal to the voltage supply dependent on a cumulative electrical energy input detected over the current service life of the electroluminescent element from a starting point in time up to a current point in time, via which at least one of the voltage amplitude and the frequency of the AC voltage is controllable.

6. The electronic control system according to claim 5, wherein the dependence of the control signal on the cumulative electrical energy input detected is established in the control unit via at least one of
    discrete comparative values and
    a stored function.

7. The electronic control system according to claim 5, wherein an adjustment of at least one of the voltage amplitude and the frequency of the AC voltage in steps is provided.

8. The electronic control system according to claim 7, wherein the control unit is equipped with a delay function, which delays the increase of at least one of the voltage amplitude and the frequency of the AC voltage until the next following time the electroluminescent element is turned on.

* * * * *